United States Patent
Fuechtling (10) Patent No.: US 9,148,999 B2
(45) Date of Patent: Oct. 6, 2015

(54) HEADER WITH SIDE SECTIONS FORMED WITH PIVOTABLY DISPOSED SUPPORTING ARMS

(71) Applicant: CLAAS SELBSTFAHRENDE ERNTEMASCHINEN GMBH, Harsewinkel (DE)

(72) Inventor: Christian Fuechtling, Rinkerode (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 171 days.

(21) Appl. No.: 14/022,640

(22) Filed: Sep. 10, 2013

(65) Prior Publication Data

US 2014/0075912 A1    Mar. 20, 2014

(30) Foreign Application Priority Data

Sep. 19, 2012 (DE) .......................... 10 2012 108 835

(51) Int. Cl.
*A01D 43/00* (2006.01)
*A01D 43/06* (2006.01)
*A01D 41/14* (2006.01)

(52) U.S. Cl.
CPC ................ *A01D 43/06* (2013.01); *A01D 41/14* (2013.01)

(58) Field of Classification Search
CPC ..... A01D 41/14; A01D 34/283; A01D 57/20; A01D 41/141; A01D 41/148

USPC .......................... 56/208, 181, 15.8, 10.4, 257
See application file for complete search history.

(56) References Cited

U.S. PATENT DOCUMENTS

| | | | | |
|---|---|---|---|---|
| 2,472,762 | A * | 6/1949 | Sage | 56/15.7 |
| 4,011,709 | A * | 3/1977 | Mott et al. | 56/10.4 |
| 4,573,308 | A * | 3/1986 | Ehrecke et al. | 56/14.4 |
| 4,599,852 | A * | 7/1986 | Kerber et al. | 56/15.8 |
| 4,800,711 | A * | 1/1989 | Hurlburt et al. | 56/219 |
| 4,956,966 | A * | 9/1990 | Patterson | 56/181 |
| 7,805,921 | B2 | 10/2010 | Coers et al. | |
| 8,051,633 | B2 * | 11/2011 | Figgins et al. | 56/181 |
| 8,495,855 | B1 * | 7/2013 | Conrad et al. | 56/181 |
| 8,601,779 | B1 * | 12/2013 | Figgins et al. | 56/181 |
| 2003/0074876 | A1 * | 4/2003 | Patterson et al. | 56/257 |

* cited by examiner

*Primary Examiner* — Árpád Fábián-Kovács
(74) *Attorney, Agent, or Firm* — Michael J. Striker

(57) ABSTRACT

A header for an agricultural machine includes a middle section disposed on a main frame and two side sections adjacent the middle section, a flexible knife bar extending across the width of the header and a conveying device behind the knife bar and designed at the side sections as an endless belt disposed adjacent to the middle section for transporting crop cut by the knife bar laterally. The side sections have supporting arms pivotably disposed on the main frame to support the knife bar of a side section and are rigidly connected to the knife bar. Each supporting arm is connected to the main frame permitting swivelling about a first rotational axis in the vertical direction and about a second rotational axis extending perpendicular to the first.

14 Claims, 8 Drawing Sheets

HEADER WITH SIDE SECTIONS FORMED WITH PIVOTABLY DISPOSED SUPPORTING ARMS

CROSS-REFERENCE TO A RELATED APPLICATION

The invention described and claimed hereinbelow is also described in German Priority Document DE 10 2012 108835.7, filed on Sep. 19, 2012. The German Priority Document, the subject matter of which is incorporated herein by reference, provides the basis for a claim of priority of invention under 35 U.S.C. 119(a)-(d).

BACKGROUND OF THE INVENTION

The invention relates to a header for an agricultural machine, for example, a combine harvester.

Headers for agricultural machines are known For example, U.S. Pat. No. 7,805,921 discloses a header with one or more ground groups, which have a frame and a finger bar arrangement. Each around group has a plurality of supporting arms, which are pivotably connected to the frame. The finger bar arrangement is rigidly attached to outer ends of the supporting arms. The supporting arms are pivotably mounted on the frame in a manner permitting swivelling about a horizontal axis in order to allow the finger bar to deflect in a locally limited manner in the vertical direction when uneven terrain is encountered.

Such known arrangement is disadvantageous, however, in that the rigid connection of the finger bar arrangement with the supporting arms and, the only one degree of freedom of the supporting arm results in low flexibility and a greater load on the finger bar due to bending and torsional forces.

A further disadvantage results from the rigid arrangement of the finger bar on the supporting arms, since the deflection of the finger bar causes steps to form due to the inflexibility of the supporting arms, thereby increasing the load on the knife drive.

SUMMARY OF THE INVENTION

The present invention overcomes the shortcomings of known arts, such as those mentioned above.

To that end, the present invention provides a header comprising a middle section disposed on a main frame and at least two side sections disposed adjacent to the middle section, a flexible knife bar extending across a width of the header and at least one conveying device disposed behind the knife bar. The conveying device is designed at the particular side sections as at least one endless belt disposed adjacent to the middle section for transporting crop cut by the knife bar laterally in the direction of the middle section. The side sections comprise a plurality of supporting arms that are pivotably disposed on the main frame, support the knife bar of the particular side section and are rigidly connected to the knife bar (6).

Each supporting arm (15) is connected to the main frame (2) in a manner permitting swivelling about a first rotational axis (20, 20a) in the vertical direction and about a second rotational axis (21, 21a) extending perpendicularly to the first rotational axis (20, 20a). The fact that the supporting arm can rotate about two rotational axes permits the finger bar to not only undergo a deflection motion when the ground contour changes, but to also twist about the longitudinal axis of the supporting arm, thereby reducing the load on the finger bar.

In addition, the finger bar and the supporting arm can better track the ground contour as viewed in the longitudinal direction of the header, i.e., the two-axis pivotal connection on the frame makes it easier for the finger bar to undergo a wave-shaped motion.

The first rotational axis extends parallel to the main frame, and the second rotational axis is pivotably connected to the first rotational axis. This arrangement has proven particularly suitable in light of the limited installation space.

Preferably, supports for connecting the supporting arms to the main frame can be disposed on the main frame.

The particular support can accommodate the first rotational axis and the second rotational axis. More particularity, two guide elements are disposed opposite one another on the support, axially parallel to the first rotational axis. Each guide element is engaged with a corresponding slot link in the supporting arm. The interplay and the guidance of the guide elements in the slot links of the supporting arms makes it possible to limit the motion of the supporting arm in a position-dependent manner with respect to the first and second rotational axes.

In an advantageous development, the guide elements are designed as end sections of a pivot axis supported in the support.

Preferably, the slot links are designed such that the slot links form end stops for the pivot motion about the first rotational axis and/or the second rotational axis. Different operating modes of the header are obtained in this manner.

To this end, the slot link can be substantially diamond-shaped. The substantially diamond-shaped design of the slot link enables the required limitations on the movability of the supporting arm. The slot link is used as an end stop for the motion of the supporting arm in the vertical direction, i.e., about the first rotational axis, in order to block movability when the supporting arm has reached an upper or lower end position, in which the supporting arm has undergone maximum deflection.

In the particular end position of supporting arm, the guide element therefore bears against an end of the slot link facing toward or away from the frame. The movement of the supporting arms in the vertical direction must be blocked when the header is used to harvest the types of crop for which flexibility of the finger bar and the conveyance device is not required, such as harvesting grain. Twisting about the second rotational axis also is prevented in this position, since the substantially diamond-shaped slot link prevents the guide element from moving in the vertical direction.

In an embodiment, a particular support is formed of two plate-shaped attaching elements disposed parallel to one another. The attaching elements are preferably designed with mirror symmetry.

The attaching elements are designed such that a distance therebetween is smaller in a region accommodating the first rotational axis than in a region accommodating the pivot axis. This design prevents the power flow within the attaching elements from deforming the support. The power flow is introduced via the twisting of the supporting arm about the second rotational axis.

Furthermore, at least one shaft extending parallel to the frame of each side section is rotatably supported in the supports. This shaft is used to control the height of the header.

The shaft is connected to a particular supporting arm y a ever arrangement. Using the lever arrangement, when the supporting arm changes position relative to the first rotational axis, the deflection of the supporting arm in the vertical direction is transferred to the shaft as a rotational motion. The greatest vertical deflection of one of the supporting arms of a side section results in the greatest rotation of the common, continuous shaft, which can be utilized to automatically adjust the height of the header.

To this end, the header (which is disposed at a feeder housing of a combine harvester), is displaced in terms of the height thereof by use of appropriate hydraulic cylinders disposed at the feeder housing such that the distance of the main frame from the ground is near identical at all side sections. The objective thereof is to prevent one or more supporting arms that have reached the maximum deflection thereof due to the ground sloping downward from becoming incapable of reacting quickly enough by moving upward if a bump in this ground contour is suddenly encountered, and wherein the finger bar is moved against this bump in the ground.

The shaft is connected to at least one sensor for detecting the rotational motion of the shaft in order to provide an appropriate control signal. Preferably, the sensor is designed as a potentiometer, which is a particularly cost-effective variant of a sensor. Each side section preferably comprises at least one potentiometer, by means of which the rotation of the at least one shaft is monitored. The signal of the at least one potentiometer at the particular side section is transferred to and evaluated by a control device on the combine harvester. The hydraulic cylinders of the feeder housing of the combine harvester are actuated and the position thereof is changed on the basis of the signal evaluation carried out by the control device.

In addition, a lifting cylinder is pivotably connected to the pivot axis, wherein the lifting cylinder is operatively connected to the supporting arm. The plurality of lifting cylinders disposed across the width of the header is used to relieve weight from the finger bar.

In an embodiment, the pressure that is applied by the particular hydraulic cylinder is increased such that the supporting arms can be rigidly positioned.

The lever arrangement is connected to the particular supporting arm by a lever arm and a section of the lifting cylinder approximately at a level with the second rotational axis in order to prevent the lever arrangement from negatively affecting the shaft due to the twisting of the supporting arm on the lifting cylinder and the transfer of the vertical deflection of the supporting arm. The greater the distance is from the plane of the rotational axis, the greater the lever is by means of which forces act on the lever arrangement and the lifting cylinder when the supporting arm twists.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
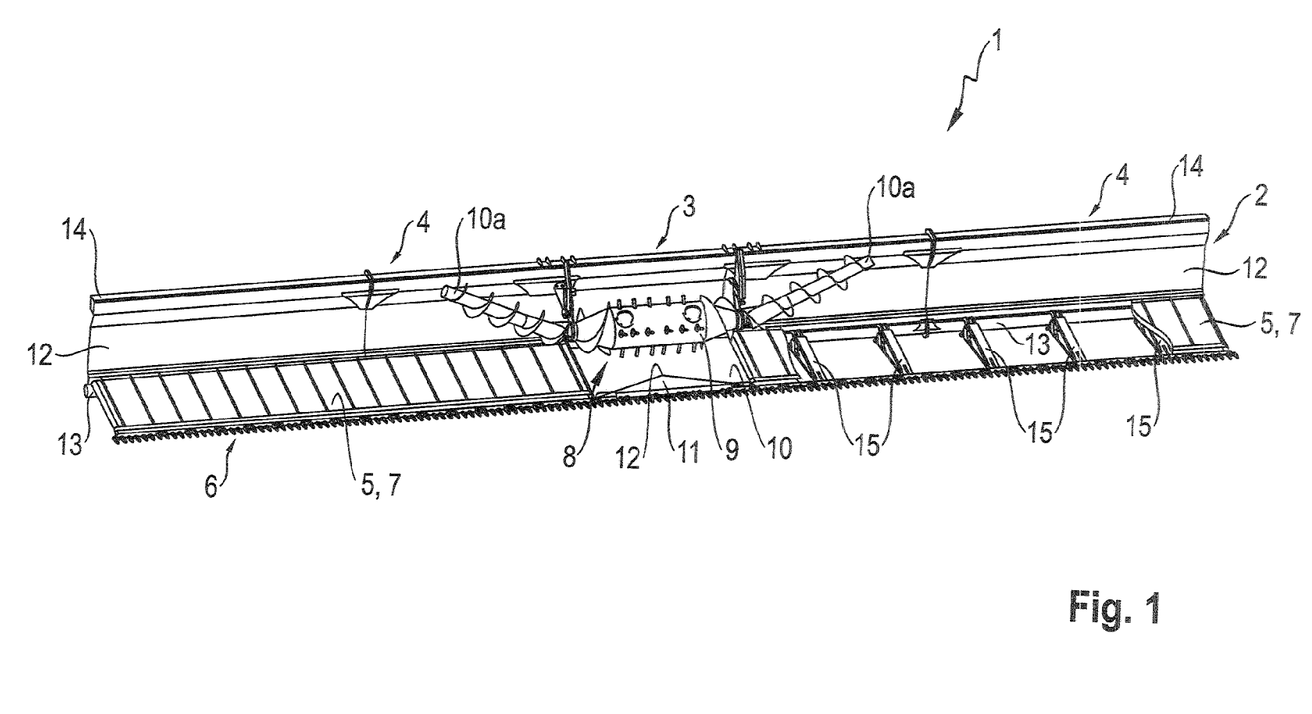
FIG. 1 presents a schematic, partially exposed view of a header.

FIG. 1 presents a schematic, partially exposed view of a header 1. The header 1 comprises a main frame 2, on which a middle section 3 and at least two side sections 4 adjacent to the middle section 3 are disposed. A continuous, flexible finger bar 6, which extends substantially across the entire width of the header 1, is disposed at the middle section 3 and the side sections 4 on the front side of the header 1 opposite the main frame 2. Reels 5 are disposed on the main frame 2 of the header 1, which extend across the width of one side section 4 and partially across the width of the middle section 3. The reels are used to improve the intake of the crop by the finger bar 6.

The crop cut by the finger bar 6 is fed to a conveying device 5 disposed behind the finger bar 6, The conveying device, is designed as at least one endlessly circulating belt 7 on the particular side sections 4. The endlessly circulating belts 7 are disposed adjacent to the middle section 3 in order to transport the crop cut by the finger bar 6 parallel to the longitudinal axis of the header 1 in the direction of the middle section 3, and to feed this crop to an intake device 8. The intake device 8 is designed as a drivable feed roller 9, to which laterally outwardly extending header augers 10a are assigned. The intake device 8 conveys the crop that has been delivered laterally by the endless belts 7 to the middle section 3 to an opening that is located in the main frame 2 and is disposed behind the feed roller 9. The crop is transferred through the opening via a feeder housing, which is located on a non-illustrated combine harvester and to which the header 1 can be attached, to the combine harvester for further processing The middle section 3 comprises a track shoe 10, which has a contoured design on the top side thereof facing the header auger 9, which is disposed above the track shoe 10. The underside of the track shoe 10 facing the ground is substantially planar. The contoured top side of the track shoe 10 comprises a wedge-shaped, raised projection 11. The projection 11 tapers from the front edge of the header 1 in the direction of the intake device 8 and leads into a tip 12 facing the feed roller 9. The projection 11 is used to forcibly redirect the crop in order to redirect the crop delivered by the belts 7 into the intake region of the intake device 8 and improve the crop intake. The height of the projection 11 varies to ensure that crop is sufficiently redirected.

In the FIG. 1 embodiment, one side section 4 is partially exposed in order to show the structure of the header 1 located underneath the belt 7. The design of side parts 4 is identical, and so only one side part 4 is shown, in a partial cross-section. The main frame 2 comprises rear panels 12, which extend vertically with respect to the direction of motion of the belt, and which are enclosed between preferably hollow cylindrical profiled elements 13, 14.

In the middle section 3, the intake device 8 is disposed at the profiled elements 13, 14 of the main frame 2. Each side section 4 comprises a plurality of supporting arms 15, which are disposed on the main frame 2 in a manner pivotable about a horizontal axis. The supporting arms 15 of the particular side section 4 support the flexible finger bar 6 and are deflected together with this finger bar in the vertical direction when the header 1 is guided over the ground in a harvesting operation. The finger bar 6 is rigidly connected to the particular supporting arm 15.

Figure 2:
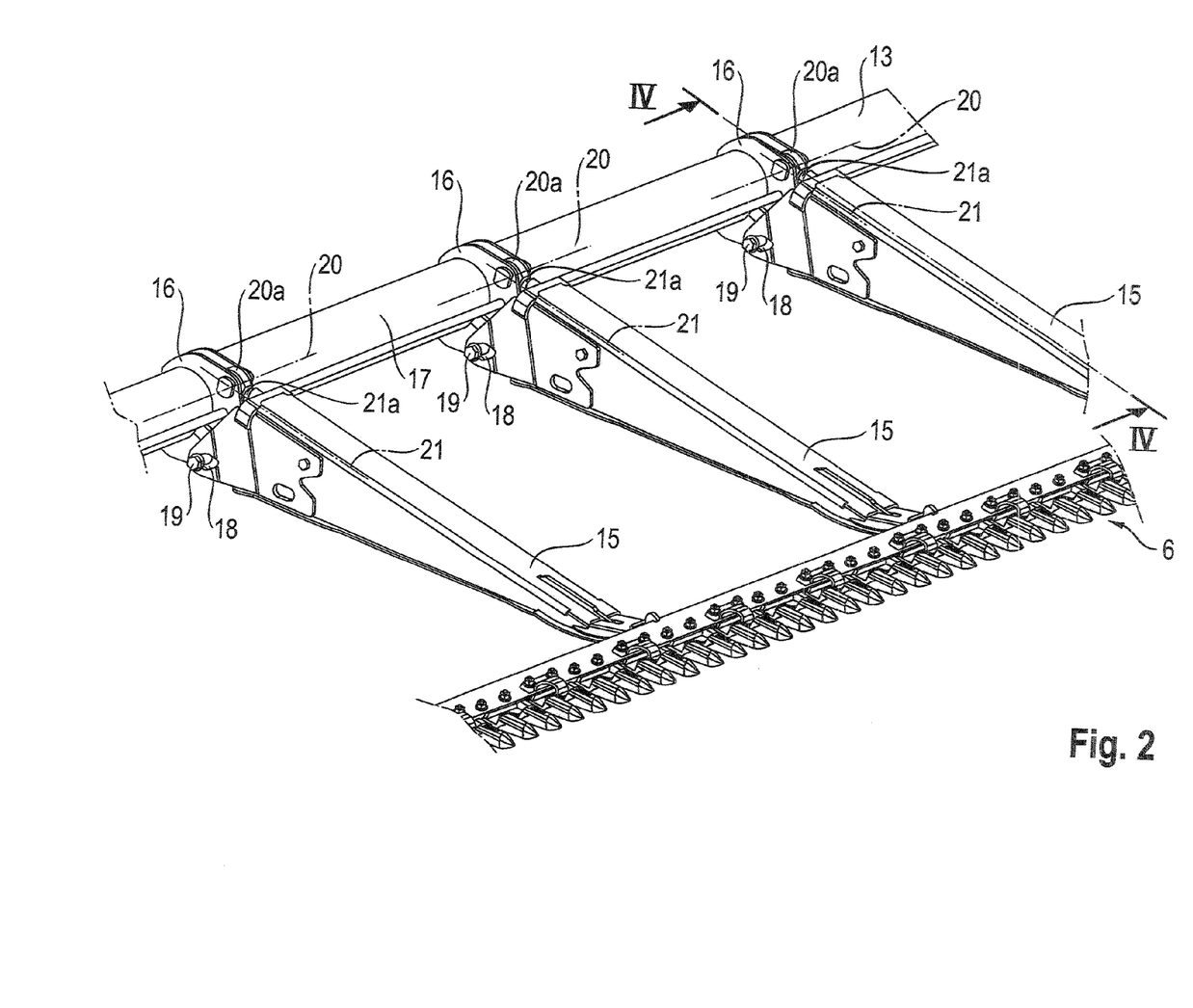
FIG. 2 presents a detailed view of the partially exposed region of the header presented in FIG. 1.

The FIG. 2 embodiment presents a detailed view of the partially exposed region of the header according to FIG. 1 in order to more clearly show the arrangement of the supporting arms 15 on the profiled element 13 of the main frame 2. Each supporting arm 15 is disposed on the profiled element 13 by one support 16. A plurality of supports 16 is distributed, with separation therebetween, across the width of the particular side section 4. The supports 16 accommodate the particular supporting arm 15 and a continuous shaft 17. The shaft extends parallel to the profiled element 13 and is rotatably supported in the supports 16. The shaft 17 extends substantially across the entire width of the side part 4. Above the shaft 17, the supporting arm 15 is supported at the support 16 in a manner permitting swivelling about a first rotational axis 20, which extends axially parallel to the profiled element 13.

The supporting arm 15 swivels in the vertical direction about the first rotational axis 20, thereby allowing the particular supporting arm 15 to track the motion when the finger bar 6 is deflected vertically due to uneven terrain. To this end, a flexible coupling 20a forming the first rotational axis 20 is disposed at the support 16. Furthermore, a pivot bearing 21a is disposed at the flexible coupling 20a and forms a second rotational axis 21. The second rotational axis 21 extends perpendicularly to the first rotational axis 20, about which the supporting arm 15 can swivel. The supporting arm 15 is directly connected to the pivot bearing 21a and to the support 16 via the placement of the pivot bearing 21a at the flexible coupling 20a.

The second rotational axis 21 enables the supporting arm 15 to perform a swivelling motion transversely to the direction of motion of the header 1. This compensation motion offsets the bending and torsional forces transferred to the supporting arm 15 and the finger bar 6 due to the rigid connection thereof, thereby reducing the load on the finger bar 6 caused, in particular, by the bending forces.

As also is shown in FIG. 2, each support 16 comprises a guide element 19 underneath the shaft 17, wherein the guide elements are diametrically opposed and are disposed axially parallel to the first rotational axis 20. Each of the guide, elements 19 is engaged with a slot link 18 in the supporting arm 15. FIG. 2 shows only one guide element 19 at the support 16 and only one corresponding slot link 18 at the supporting arm 15, although these are disposed on both sides of the support 16 due to the symmetrical design of the supports 16. The slot links 18 have a substantially diamond-shaped curved path in order to limit the motion of the supporting arm 15 in a location-dependent manner upon swivelling about one or both rotational axes 20, 21.

Figure 3:
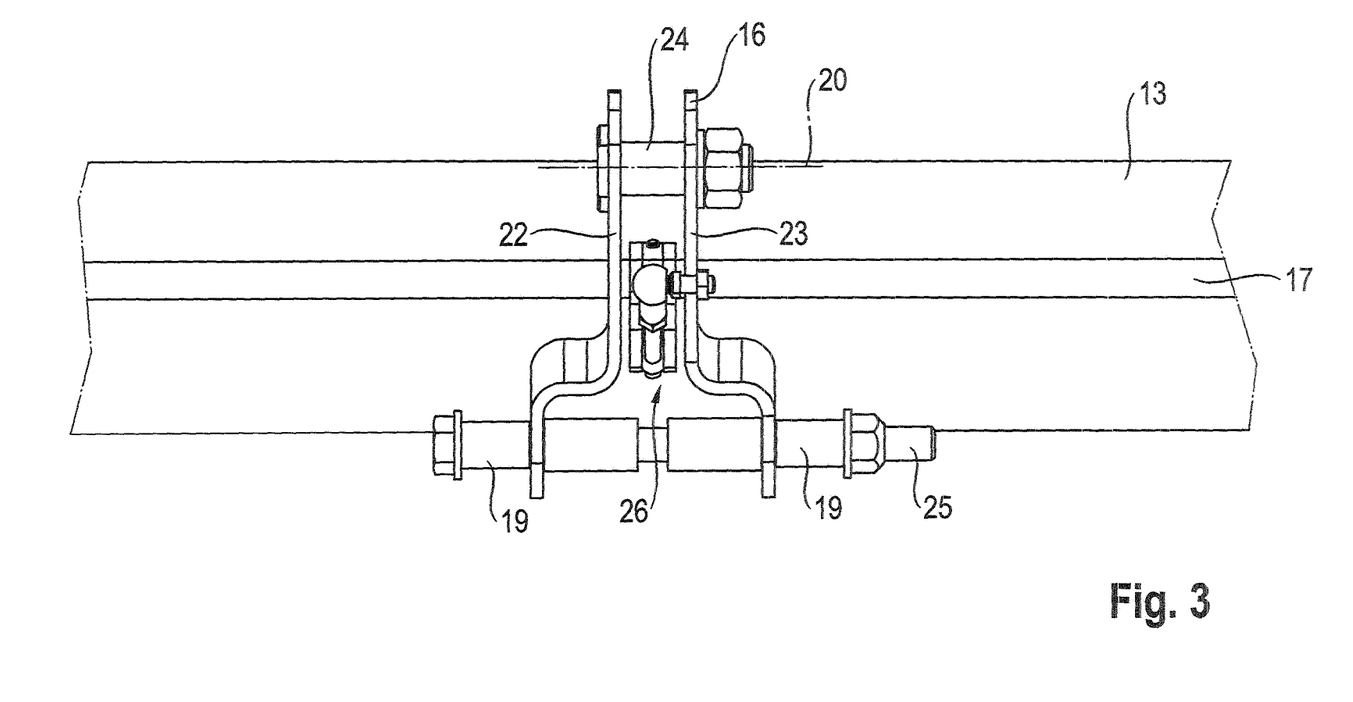
FIG. 3 presents a top view of a support presented in FIG. 2, without the supporting arm disposed thereon.

FIG. 3 presents a top view of a support 16 according to FIG. 2, without the supporting arm 15 disposed thereon. The, support 16 is formed of two plate-shaped attaching elements 22, 23 disposed parallel to one another, and which are disposed with mirror symmetry relative to a longitudinal axis of the support 16. The attaching elements 22, 23 have a substantially S-shaped contour and therefore are disposed closer to one another in a region of the support 16 located above the shaft 17 than in a region located underneath the shaft. The attaching elements 22, 23 are disposed on the profiled element 13 of the main frame 2 in the upper region of the support 16, separated from one another via a first bolt 24. A second bolt 25 is located in the region of the support 16 underneath the shaft 17, wherein this bolt interconnects the sections of the attaching elements 22, 23 that are further apart from one another. The first bolt 24 supports the flexible coupling 20a, about the rotational axis 20 of which the supporting arm 15 can swivel in the vertical direction. The first bolt 24 and the second bolt 25 are disposed axially parallel with respect to one another.

Figure 5A:
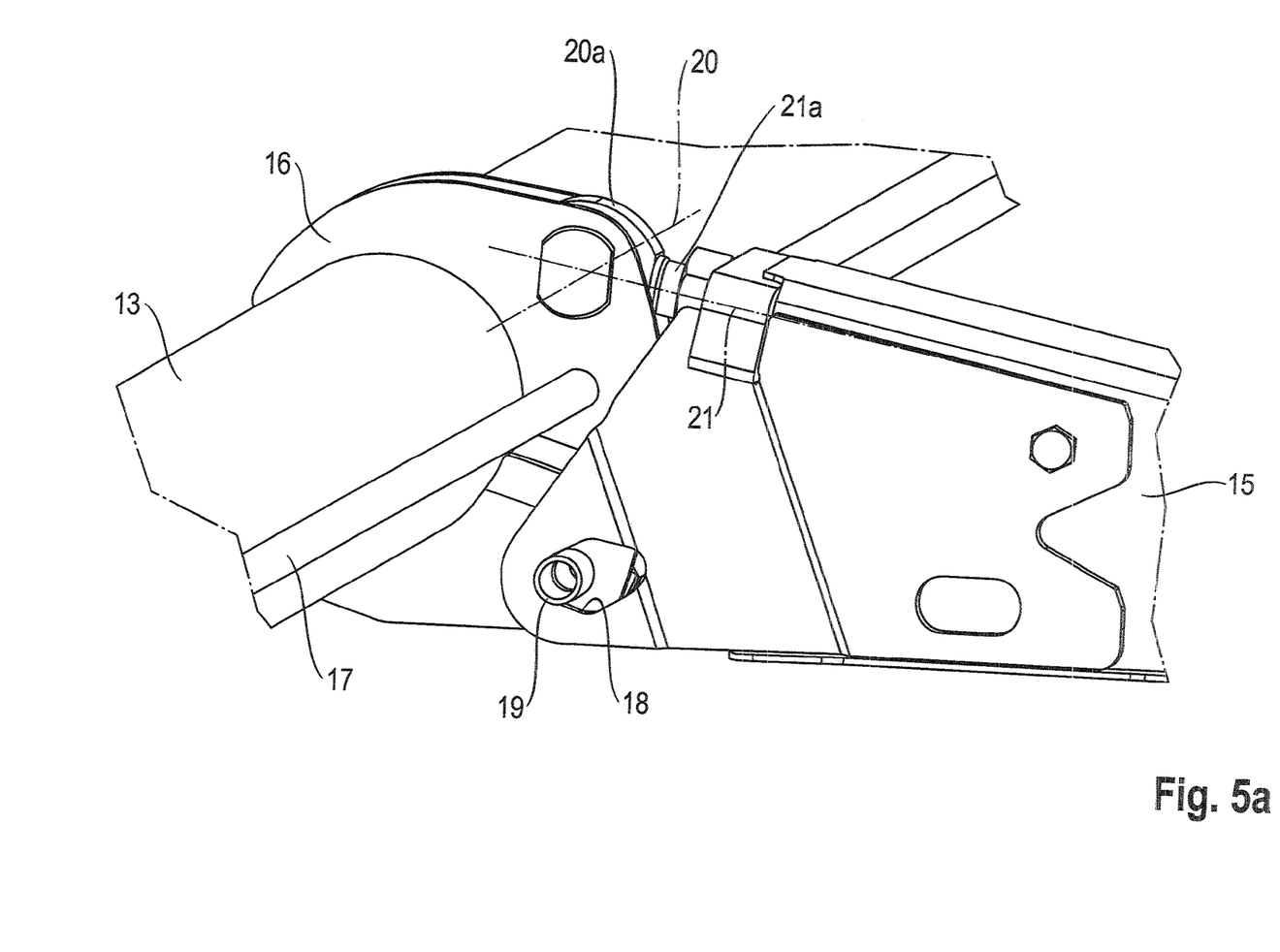
FIGS. 5a-5d together present perspective partial views of the main frame having a supporting arm in different positions.
Figure 5B:
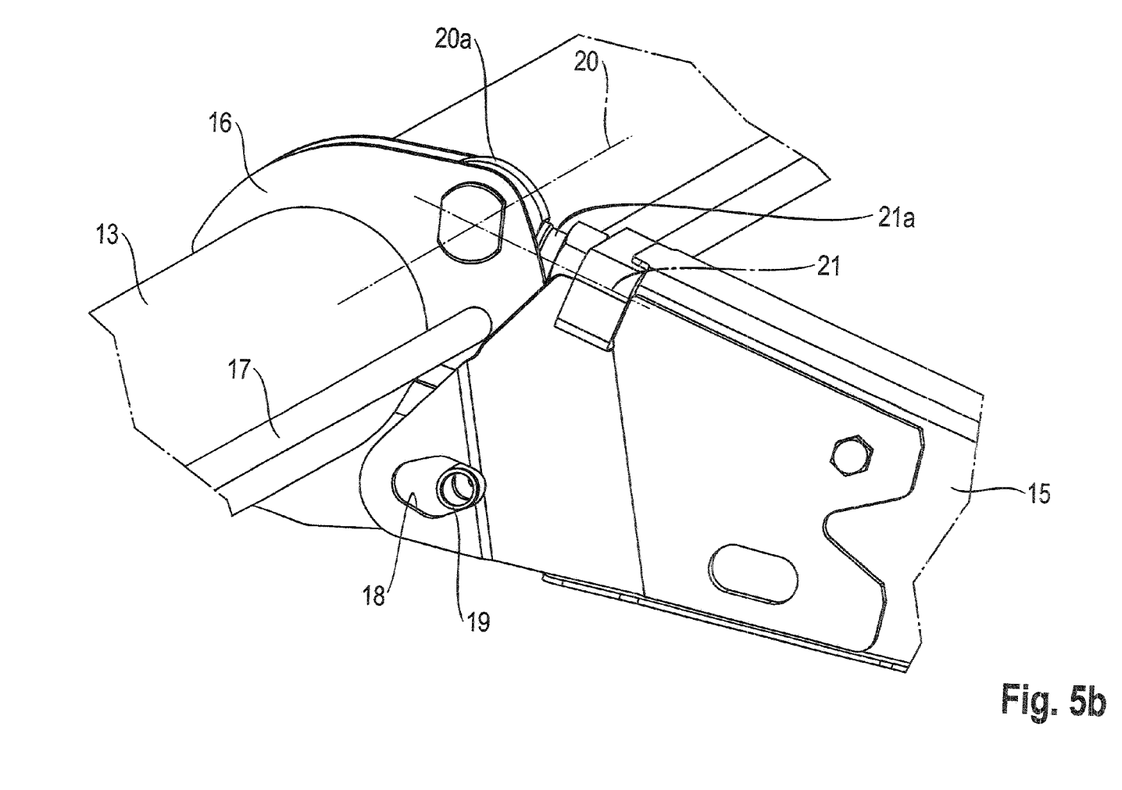

In addition, the distances of the through-holes of the particular attaching element 22, 23 relative to one another, through which the first bolt 24 and the second bolt 25 extend, are selected such that a substantially triangular design of the support 16 results. The power flow within the support 16 follows this triangular design, thereby ensuring that, when the supporting arm 15 swivels, a rotationally stable position is reached in the end positions, as illustrated in FIGS. 5a and 5b. This improves the hold of the finger bar 6 when the header 1 is used in an operating mode in which the finger bar 6 and the supporting arms 15 must be rigidly guided over the ground relative to the main frame 2, as is the case when harvesting grain, for example. The guide elements 19 are designed as sections at the ends of the second bolt 25 disposed in the support 16. The guide elements 19 are sleeves that are slid onto the bolt 25.

FIG. 3 shows a lever arrangement 26 for connecting the shaft 17 to the supporting arm 15. The lever arrangement 26 is used to transfer the deflection of the supporting arm 15 in the vertical direction onto the shaft 17. Using the lever arrangement 26, the deflection of the supporting arm 15 in the vertical direction is transferred onto the shaft 17 as a rotational motion when the supporting arm 15 changes position relative to the first rotational axis 20. The greatest vertical deflection of a supporting arm 15 at a side section 4 results in the greatest rotation of the shaft 17. Rotation of the shaft can be utilized as a signal for evaluation in order to automatically adjust the height of the header 1. To this end, the header 1 (which is disposed at a feeder housing of a combine harvester) is displaced in terms of the height thereof by use of appropriate hydraulic cylinders disposed at the feeder housing such that the distance of the main frame 2 from the ground is near identical at all side sections 4.

Figure 4:
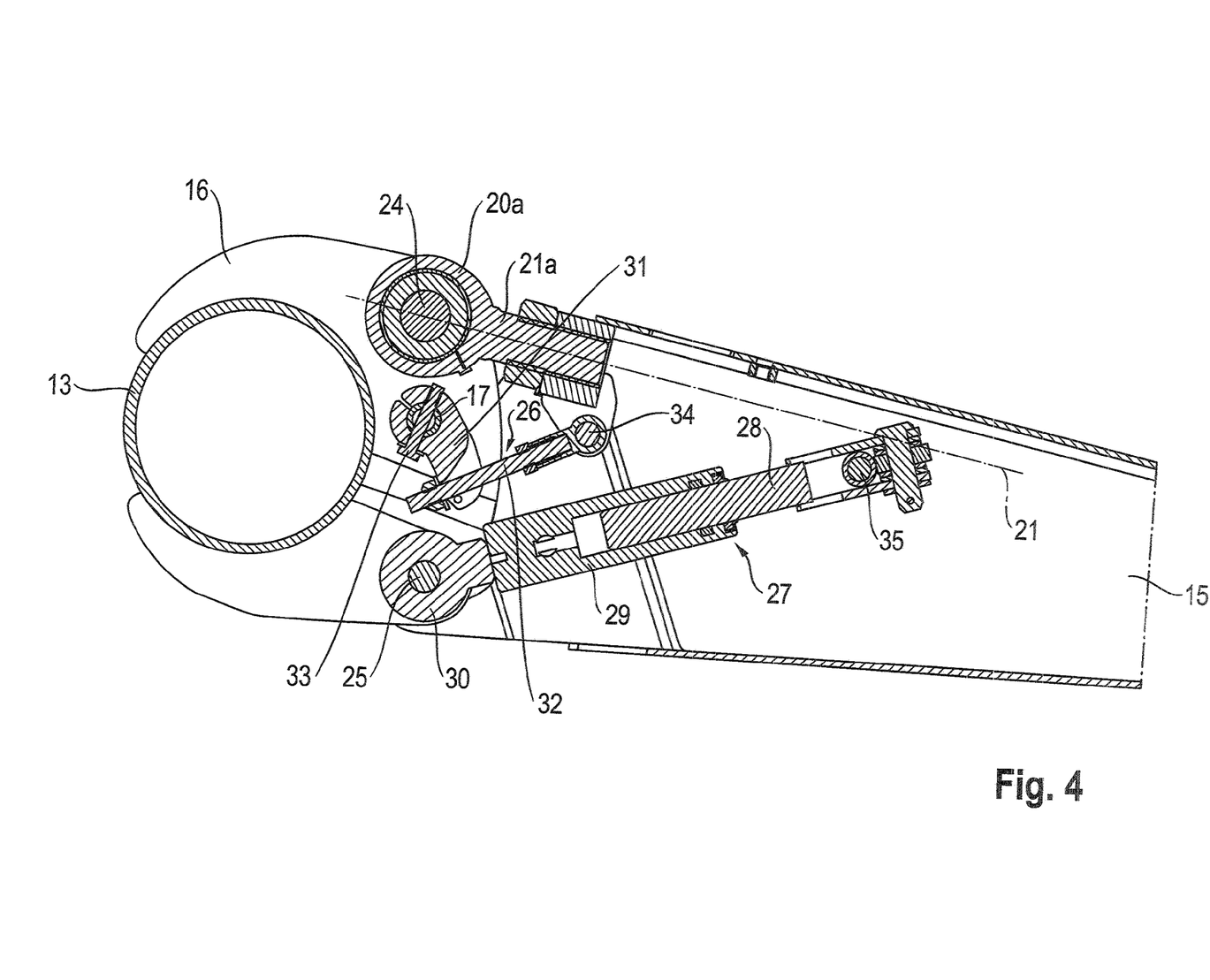
FIG. 4 presents a partial longitudinal sectional view of the support 16 and the supporting arm 15 disposed thereon, along the line IV-IV according to FIG. 2.

Fig. depicts the support 16 and the supporting arm 15 disposed thereon in a partial longitudinal sectional view along the line IV-IV according to FIG. 2. A lifting cylinder 27 is disposed in the interior of each supporting arm 15 and is supported on the main frame 2 via the support 16. The lifting cylinder is used to relieve weight from the finger bar 6. The lifting cylinder 27 comprises a piston 28 and a cylinder 29. The second bolt 25 forms a pivot axis for the lifting cylinder 27. To this end, the lifting cylinder 27 is disposed, with the cylinder 29 thereof, at the support 16 in a manner permitting swivelling about the second bolt 25 via a flexible coupling 30.

The piston 28 is pivotably connected at a pivot axis 35 on the inner side of the supporting arm 15. The pressure applied by the lifting cylinder 27 is changeable. More particularly, the pressure can be increased to the extent that the supporting arm 15 is near rigidly positioned relative to the main frame 2, thereby enabling the header 1 to operate in an operating mode for harvesting grain, for instance. The lifting cylinder 27 is pivotably connected at the pivot axis 35 in the interior of the supporting arm 15 approximately in the direct vicinity of the second rotational axis 21, thereby ensuring that the lifting cylinder 27 transfers the least amount of torque possible to the supporting arm 15 when this supporting arm swivels about the first rotational axis 20.

The lever arrangement 26 comprises a first leg 31, which is non-rotatably connected to the shaft 17 by a splint or a bolt 33. The first leg 31 is connected to a second leg 32 such that these can move relative to one another. The second leg 32 is supported in a manner allowing rotation about a pivot axis 34 of the lever arrangement 26. An upward motion of the supporting arm 15 due to uneven terrain causes this motion to be transferred via the second leg 32 to the first leg 31 and, therefore, to the shaft 17, which is non-rotatably connected to the first leg 31.

Since the deflection of the supporting arms 15 due to an uneven ground contour can differ across the width of a side section 4 of the header 1, the shaft 17 is rotated by the particular supporting arm 15 to a different extent in each case via the first leg 31. This rotational motion of the shaft 17 is detected at each side section 4 by at least one sensor, which is preferably designed as a rotary potentiometer. The greatest vertical deflection of a supporting arm 15 at a side section 4 results in the greatest rotation of the shaft 17.

FIGS. 5a-5d present perspective partial views of the main frame 2 having a supporting arm 5 in different positions. The limitation of motion by means of the diamond-shaped curved path of the slot link 18 is now explained by reference to FIGS. 5a-5d.

As shown in FIG. 5a, the supporting arm 15 is located in a position in which the guide element 19 bears against the end section of the slot link 18 facing the main frame 2. The supporting arm 15 has been moved in the vertical direction into a position further and further away from the ground. This motion and the path that can be travelled upwardly by the supporting arm 15 in the vertical direction is limited by the guide element 19 bearing against the end section of the slot link 18. The supporting arm 15 is deflected in the vertical direction in response to very uneven terrain or because the header 1 is switched into an operating mode in which the supporting arm 15 does not need to swivel about the first rotational axis 20, i.e., when the header 1 should be operated in a manner that is rigid and incapable of tracking the property of the ground contour, as is the case when harvesting grain, for example.

FIG. 5b shows a position of the supporting arm 15 in which the guide element 19 bears against the end section of the slot link 18 that faces away from the main frame 2. The supporting arm 15 is located in a lower position facing the ground. This downwardly directed motion and the path that can be travelled downwardly by the supporting arm 15 in the vertical direction is limited by the guide element 19 bearing against this end section of the slot link 18. When one of the two end sections of the slot link 18 is reached, the swivelling about the first rotational axis 20 is blocked.

Figure 5C:
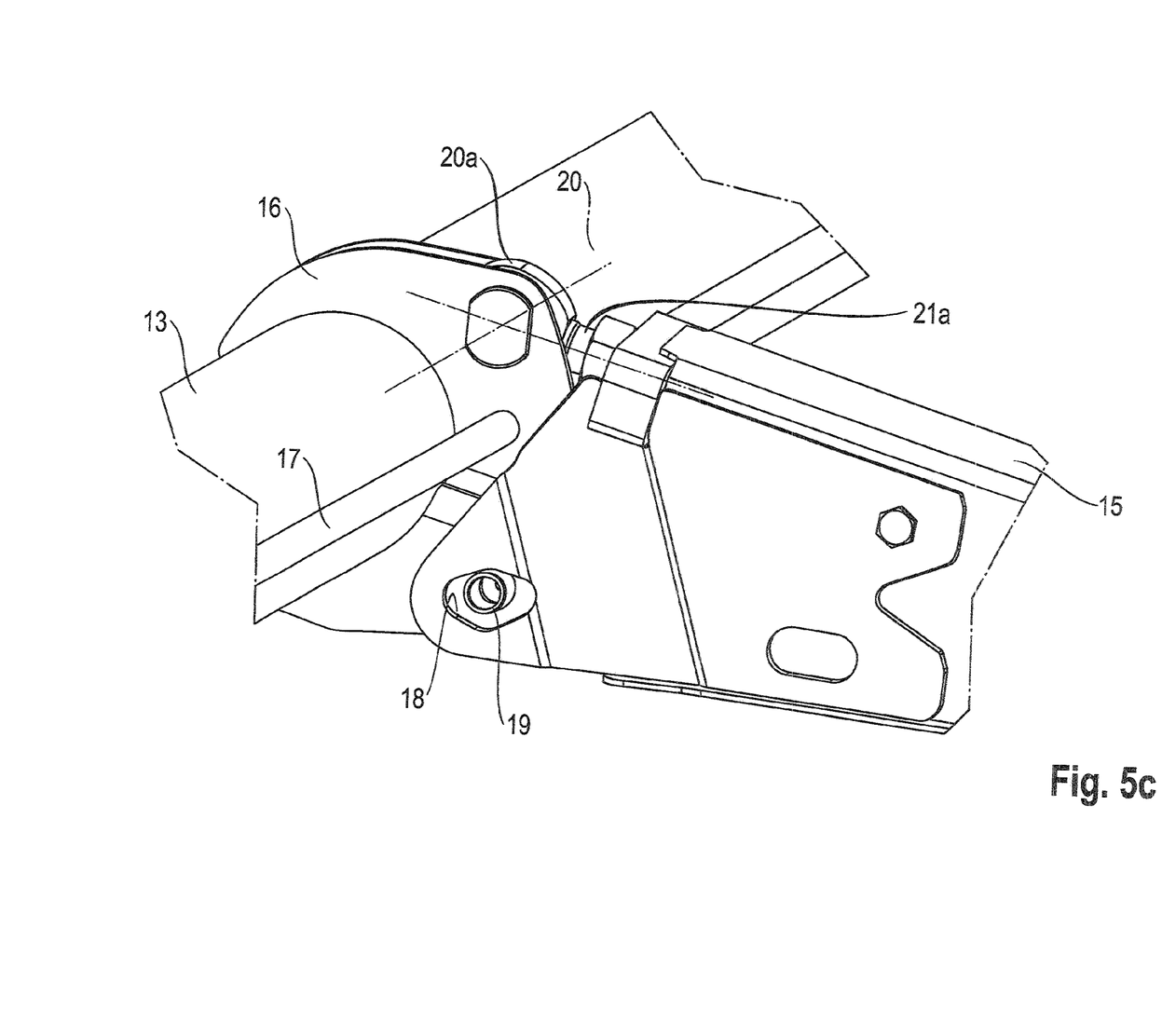
Figure 5D:
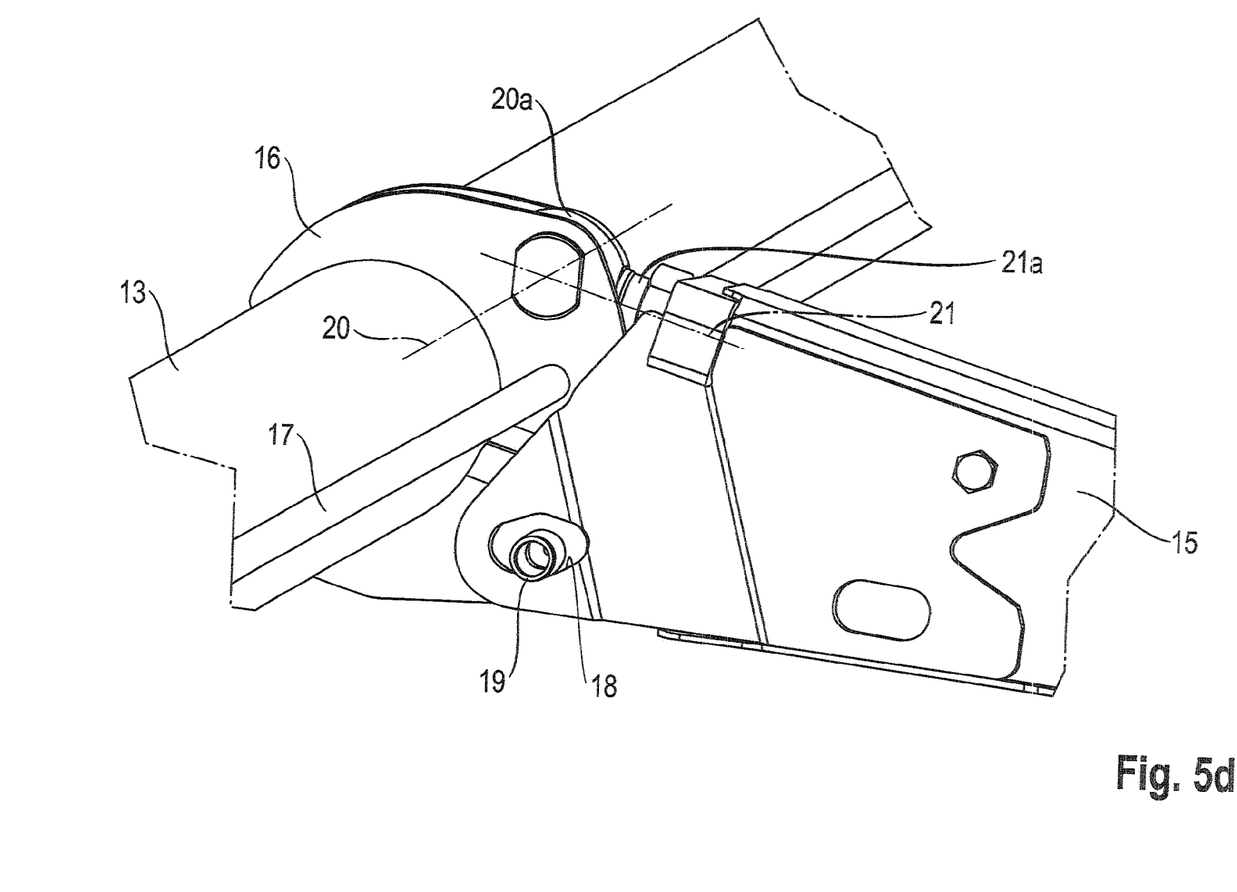

Positions of the supporting arm 15 are shown in FIGS. 5c and 5d in which the supporting arm 15 was swivelled about the second rotational axis 21. In FIG. 5c, the guide element 19 bears against an upper middle section of the slot link 18. In this position of the guide element 19, the supporting arm 15 is blocked from swivelling about the second rotational axis 21, while the supporting arm 15 can swivel about the first rotational axis 20 in the vertical direction. FIG. 5d shows the opposite position of the guide element 19, in which the guide element 19 bears against a lower middle section of the slot link 18.

LIST OF REFERENCE SIGNS 1 header
2 main frame
3 middle section
4 side section
5 conveying device
6 knife bar
7 belt
8 intake device
9 feed roller
10 floor plate
11 projection
12 tip
13 profiled element
14 profiled element
15 supporting arm
16 support
17 shaft
18 slot link
19 guide element
20 first rotational axis
20a flexible coupling
21 second rotational axis
21a pivot bearing
22 attaching element
23 attaching element
24 first bolt
25 second bolt
26 lever arrangement
27 lifting cylinder
28 piston
29 cylinder
30 flexible coupling
31 first lea
32 second leg
33 bolt
34 pivot axis
35 pivot axis As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A header (1), comprising:
    a middle section (3) disposed on a main frame (2) and at least two side sections (4) disposed adjacent to the middle section (3), a flexible knife bar (6) extending across the width of the header, and
    a conveying device (5) disposed behind the knife bar (6) and designed at the particular side sections (4) as an endless belt (7), disposed adjacent to the middle section (3) for transporting crop cut by the knife bar (6) laterally in the direction of the middle section (3),
    wherein the side sections (4) comprise a plurality of supporting arms (15) pivotably disposed on the main frame (2) that support the knife bar (6) of the particular side section (4) and are rigidly connected to the knife bar (6), and
    wherein each supporting arm (15) is mounted on a profiled element (13, 14) of the main frame (2) by a support (16),
    wherein a pivot joint (20a) is mounted on the support (16), which forms a first rotational axis (20) that extends axially parallel to the profiled element (13, 14), about which the supporting arms (15) can pivot in the vertical direction, and
    wherein a pivot bearing (21a) is mounted on the pivot joint (20a) to form a second rotational axis (21) extending perpendicularly to the first rotational axis (20), about which the support arms (15) can pivot transversely to the direction of movement of the header (1).

2. The header (1) according to claim 1, wherein the first rotational axis (20) extends parallel to the main frame (2) and the second rotational axis (21) is pivotably connected at the first rotational axis (20).

3. The header (1) according to claim 1, wherein supports (16) for connecting the supporting arms (15) to the main frame (2) are disposed on the main frame (2).

4. The header (1) according to claim 3, wherein the support (16) accommodates the first rotational axis (20) and the second rotational axis (21).

5. The header (1) according to claim 3, wherein two guide elements (19) are disposed opposite one another on the support (16), axially parallel to the first rotational axis (20) and wherein each guide element is engaged with a slot link (18) in the supporting arm (15).

6. The header according to claim 5, wherein the guide elements (19) are end sections of a pivot axis (25) supported in the support (16).

7. The header according to claim 5, wherein the slot links (18) form end stops for the pivot motion about the first rotational axis (20), the second rotational axis (21) or both.

8. The header (1) according to claim 5, wherein the slot link (18) is substantially diamond-shaped.

9. The header (1) according to claim 5, wherein the support (16) is formed of two plate-shaped attaching elements (22, 23) disposed parallel to one another.

10. The header (1) according to claim 9, wherein the attaching elements (22, 23) are designed so that a distance therebetween is smaller in a region accommodating the first rotational axis (20) than in a region accommodating the pivot axis (25).

11. The header (1) according to claim 3, wherein at least one shaft (17) extending parallel to the main frame (2) of each side section (4) is rotatably supported in the supports (16).

12. The header (1) according to claim 11, wherein the shaft (17) is connected to a particular supporting are (15) via a lever arrangement (26).

13. The header (1) according to claim 6, wherein a lifting cylinder (27), arranged to swivel about the pivot axis, is pivotably connected to the support (16) and is operatively connected to the supporting arm (15).

14. The header according to claim 13, wherein the lifting cylinder (27) operates to rigidly position the supporting arms (15).

* * * * *